Patented Oct. 20, 1936

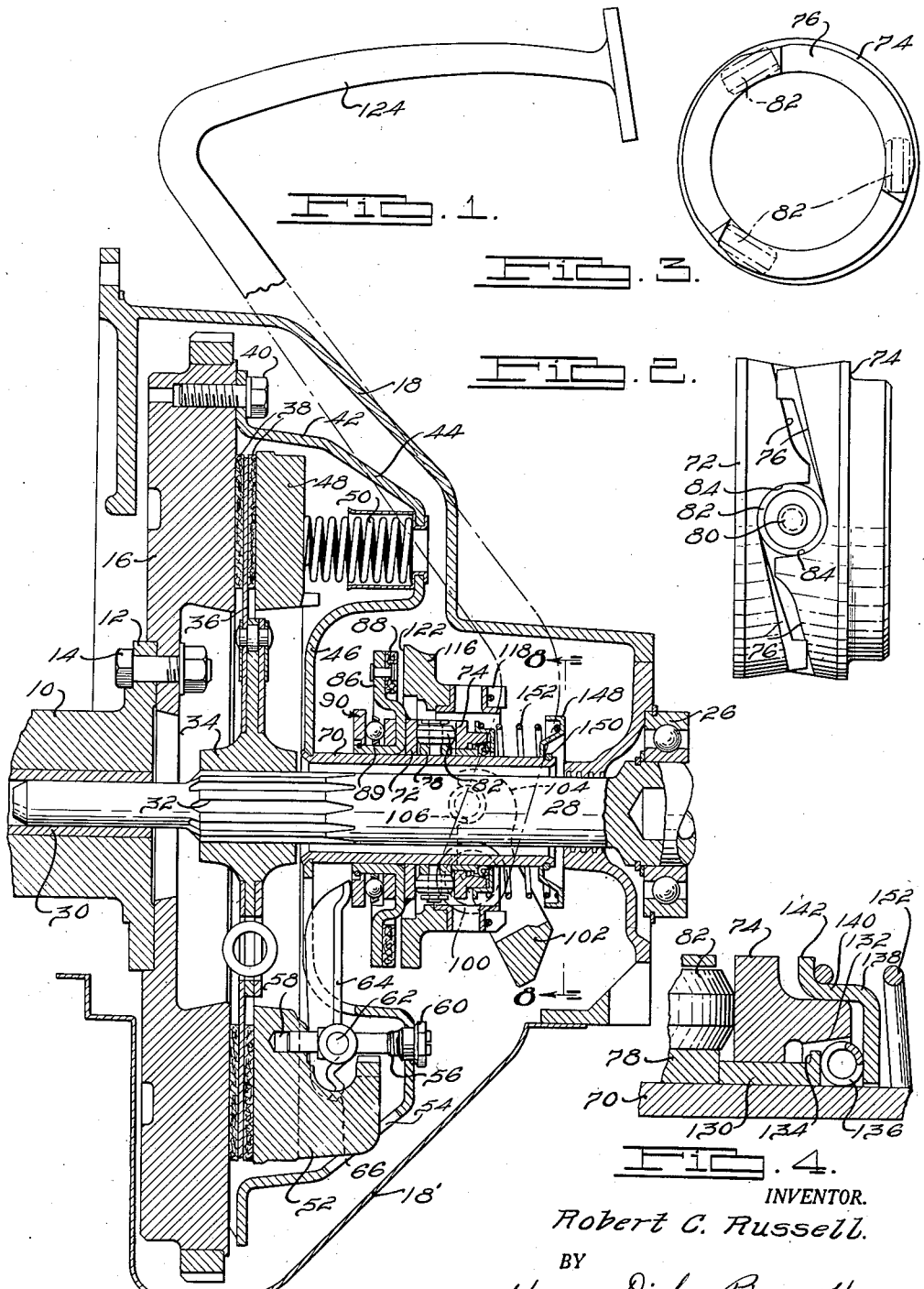

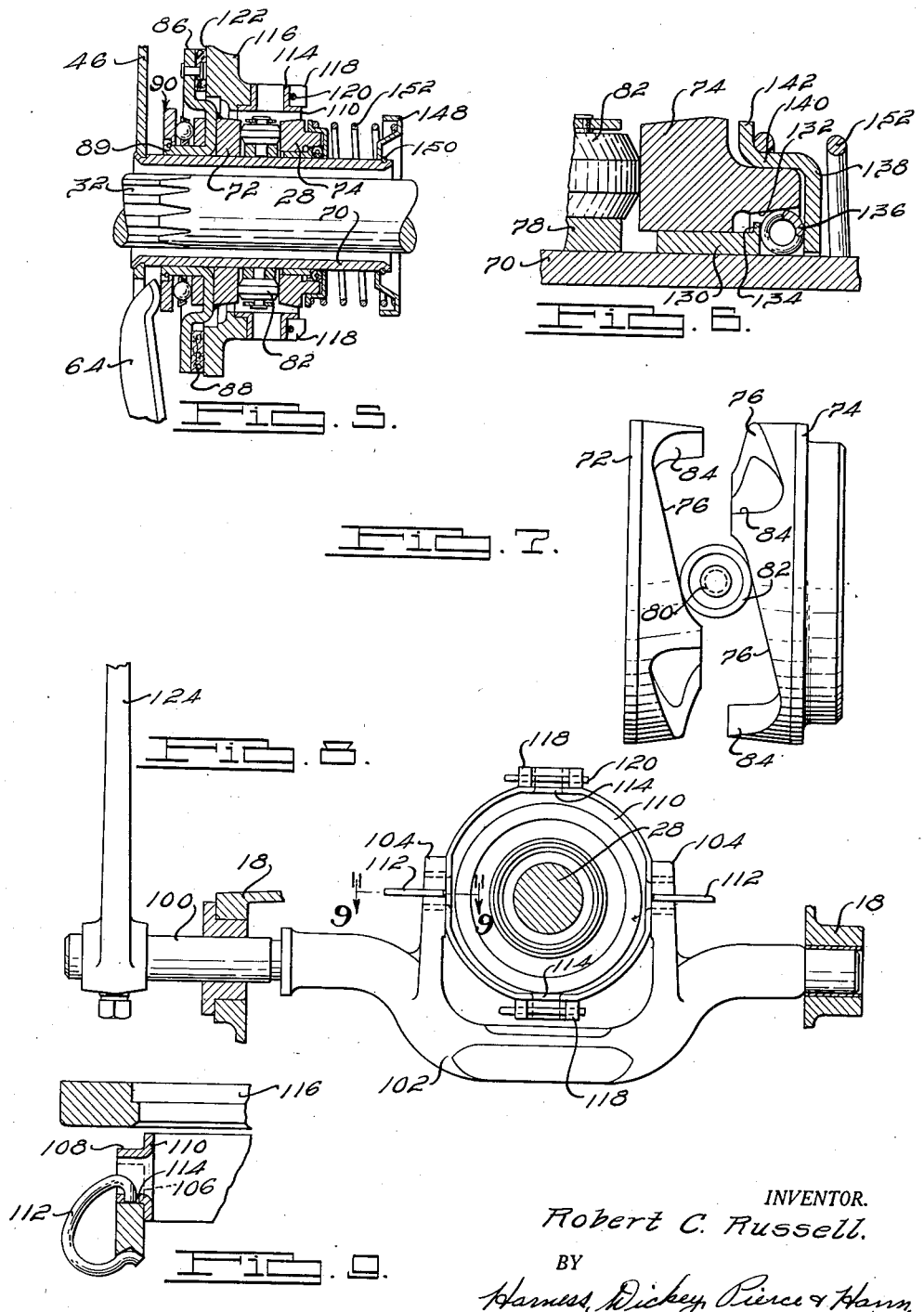

2,057,742

UNITED STATES PATENT OFFICE 2,057,742

CLUTCH STRUCTURE

Robert C. Russell, Cleveland, Ohio

Application January 16, 1935, Serial No. 1,992

16 Claims. (Cl. 192—36)

This invention relates to automatic adjustment mechanism for adjusting the operative relationship between operatively connected parts and while in the broader aspects of the invention it is applicable to a number of different uses it is particularly adaptable for use in connection with a servo clutch where it may be employed with the servo mechanism to adjust the operative relation of these parts to each other to compensate for wear or other conditions arising in or between them.

Objects of the invention include the provision of means associated with an operating device and a device to be operated thereby so constructed and arranged as to adjust the operative relationship of one device with respect to the other, if necessary, each time the operated device is operated on by the operating device; the provision of an automatically adjustable stop mechanism for backing up an operating device whereby to compensate for variations arising in the relation between the operative device and a device to be operated thereby; the provision of means for backing up an operating device so constructed and arranged as to be capable of automatically changing its relation in either of two directions with respect to the operating device for compensating for changes in the operative relation between the operating device and a device to be operated thereby; and the provision of a stop member in combination with an operating device, so constructed and arranged as to permit the operating device to shift its axial and rotatable positions when not engaged in active operation whereby to enable the operating device to adjust its inoperative position to compensate for variations in its relation to a device to be operated, and to lock said operating device against rotation and axial movement in one direction upon initiation of its operating movement.

Other objects include the provision of a pair of cooperating members so constructed and arranged as to effect axial advancement of one with respect to the other upon relative rotation between them, a stop element being associated with one of said members and being so constructed and arranged as to be released when the members are in their normally inoperative positions and to be rendered effective upon initiation of relative rotation between said members to effect said axial advancement; the provision, in combination, with an actuating member having a cylindrical support upon which it is slidably received, of a stop element engageable with the actuating member to limit axial movement thereof in one direction, means being provided for releasing said stop member from effective stopping relation with respect to the actuating member when the actuating member is in released position, and means for rendering said stop release means inoperative upon initiation of an operation by the operating member; the provision of means actuated by a relative operating movement of an operating part for rendering a stop element for an operating part effective and for releasing the effect of the stop member on the operating part upon release of the load opposing movement of the actuating part; and the provision of an actuating member suitably supported for relative sliding movement in either axial direction, a stop member engageable with the actuating member to limit movement thereof in one direction, means for releasing the stop member from operative relation with respect to the actuating part, spring means effective to urge the stop release means to stop releasing position only when the actuating part is not in active power transmitting operation, and means constantly urging the stop member toward operative relation with respect to the actuating part.

Further objects are to provide, in a servo clutch, means operable to automatically adjust the relation between the servo mechanism and the clutch proper each time the clutch is operated; to provide a normally released stop element for a servo mechanism which is rendered operative upon initiation of the actuating movement of the servo mechanism; the provision of a clutch having a servo mechanism for moving it to released position against the force of packing springs and means cooperating with the servo mechanism permitting it to automatically adjust itself to compensate for wear of the clutch during inoperative periods of the servo mechanism; the provision of a spring packed clutch having actuating fingers and a servo mechanism cooperating with the fingers to effect release of the clutch against the force of the packing springs, a stop member being provided for locking a part of the servo mechanism against movement during operative periods of the servo mechanism, and means associated with the servo mechanism adapted to employ the force of the clutch packing springs to release the stop member only during those periods when the servo mechanism is in clutch engaged position; and the provision of new and novel means in a servo mechanism for rendering a stop member inactive during inactive periods of the servo mechanism so as to permit itself to become adjusted to varying conditions in the device to be operated thereby and to be rendered effective upon initiation of the actuating movement of the servo mechanism.

Still further objects of the invention are the provision of means for assuring equalized pressure between the two brake parts of the servo mechanism; the provision of a servo mechanism having a pair of axially opposed braking members and means for universally mounting one of such members whereby to assure correct alignment thereof with the other of such members during operation thereof; the provision of means in combination with a clutch having a servo actuating mechanism including a pair of braking members of an actuating means for one of the braking members and a supporting connection between the actuating means and one of the braking members permitting such member to pivot about two different axes whereby to allow such member to adjust itself into proper alignment with the other of the members.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a sectional view taken axially through a clutch and servo actuating mechanism therefor, the clutch being shown in engaged position and the servo mechanism being shown in inoperative position.

Fig. 2 is an enlarged side elevational view of the cam members and cooperating rollers of the servo mechanism shown in Fig. 1.

Fig. 3 is a slightly reduced end view of one of the cam members shown in Fig. 2 looking at the cam face thereof, the position of the cooperating rollers being indicated by dotted lines.

Fig. 4 is an enlarged fragmentary sectional view illustrating the relation of the stop member and cooperating parts with respect to the right hand cam member of the servo mechanism as illustrated in Fig. 1, illustrating the position of the same when the servo mechanism is in inoperative position and the clutch in engaged position.

Fig. 5 is a fragmentary view of the servo mechanism shown in the preceding views, shown in section taken axially therethrough, when in operative position so as to place the clutch in disengaged position.

Fig. 6 is a view similar to Fig. 4 but showing the parts thereof in positions corresponding to the positions of the parts shown in Fig. 5.

Fig. 7 is a view similar to Fig. 2 but illustrating the positions of the cam members when the clutch is in disengaged position as indicated in Fig. 5.

Fig. 8 is a transverse sectional view on a reduced scale taken on the line 8—8 of Fig. 1.

Fig. 9 is an enlarged fragmentary sectional view taken on the line 9—9 of Fig. 8.

Although it will be understood that the present invention is adaptable to a variety of different uses as will be apparent to those skilled in the art upon the disclosure herein given, it is shown herein, particularly for the purpose of illustration, in connection with a clutch structure of the type shown and claimed in my United States Letters Patent No. 1,967,563 issued July 24, 1934 on Clutch, for the reason that it is particularly applicable to a construction as there disclosed, and further because this application to such a clutch structure involves certain further inventive concepts.

My above identified patent shows a spring packed clutch of conventional construction having associated therewith a servo mechanism of novel construction including a pair of members so constructed and arranged that relative rotation between them effects axial advancement of one of them, and such axial advancement of one of such members is employed through the medium of the usual clutch fingers to cause disengagement of the clutch. Particularly where these relatively rotatable members have cooperating inclined cam surfaces or teeth on opposed ends thereof between which anti-friction members may or may not be interposed, the degree of rotation of one of the cam members with respect to the other thereof is necessarily limited and the arrangement of the cam members must be such that during this limited rotation one of them must be advanced sufficiently to effect complete disengagement of the clutch. Not only must this cam member advance sufficiently to disengage the clutch but the force required to cause such advancement must be as small as possible so that the cooperating surfaces of the braking means for the advancing cam member by causing relative rotation between the cam members will not be great enough to unduly wear or burn out the braking surfaces of the servo mechanism. For this reason it is desirable to utilize if possible the entire possible relative rotatable movement between the cam members to effect the complete disengaging movement of the clutch.

This latter feature is not possible in the construction shown in my above identified patent for the reason that provisions must be made to take care of the wear of the clutch and other parts of the mechanism, and although provisions were made in the construction shown in my above identified patent for adjusting the position of the stationary cam member to compensate for such wear, in order that such means would not require too frequent adjustment, about sixty percent only of the available relative rotatable movement between the cam members was employed for actuating the clutch to full disengaged position, the remaining approximate forty percent of the possible relative rotation between the cam members being retained merely as a safety measure for compensating for wear of the clutch between adjustments. By applying the present invention to the structure shown in my previous patent above identified, the operative relationship between the servo mechanism and the main clutch structure is automatically adjusted upon each operation of the clutch. This not only means that it is never necessary to manually adjust the relationship of the servo mechanism to the main clutch structure, but additionally it makes it possible to use the entire available relative rotational movement between the cam members to move the clutch from engaged to disengaged position, thereby enabling the cam surfaces of the cam members to be formed at a minimum angle and thus requiring a minimum of breaking effort upon the movable cam member to effect its actuation to full disengaged position.

In the clutch structure shown in my above identified patent the axially advancing cam member was provided with an axially facing brake member adapted to cooperate with a manually actuated axially movable brake member to effect a retardation in the rotation of the first mentioned brake member. The manually advanceable brake member was mounted for sliding movement upon a suitable support which thereby predetermined the axial position of the same. It has been found in practice that due to usual manufacturing variations and tolerances it was not always possible to construct and maintain the cooperating surfaces of these brake elements so as to engage at all times over the complete extent their cooperating surfaces with the same pressure, and this deficiency in some instances produced undesirable conditions in the operation of the servo mechanism. In accordance with another phase of the present invention means are provided for eliminating the possibility of any difficulty in this direction by mounting the manually advanceable brake element for universal movement, whereby upon contact with the rotatable brake element secured to one of the cam members the two brake elements will automatically adjust themselves for conditions of equal pressure throughout their contacting areas.

Referring now to the drawings, an engine crank shaft is indicated at 10 having a flange 12 formed on its rear end which is secured by bolts 14 to a flywheel 16. A clutch housing 18, 18' envelopes the flywheel 16, is adapted to be secured at its forward end to the crank case (not shown) of an internal combustion engine and is adapted to have secured and to support at its rear end a transmission housing (not shown) is accordance with conventional practice. Rotatably mounted in a suitable bearing 26 carried by the front wall of the transmission casing in axially aligned relation with the crank shaft 10 is a forwardly projecting shaft 28 the forward reduced end portion of which is rotatably supported by a bearing 30 mounted within the rear end of the crank shaft 10 in a conventional manner. Immediately rearwardly of the flange 12 of the crank shaft 10 the shaft 28 is splined as at 32 and slidably but not rotatably received thereon is the hub 34 of a clutch driven member or disc 36 provided on opposite faces with an annular ring 38 of suitable friction material in accordance with conventional practice. Secured to the rear face of the rim portion of the flywheel 16 as by cap screws 40 is a clutch cover 42, shown as being formed from sheet metal and formed to provide a rearwardly projecting annular portion 44 of forwardly facing channel section terminating at its axially forward and radially inward edge in a radially directed portion 46 which extends into spaced but concentric relation with respect to the shaft 28. A pressure plate 48 of ring-like formation is located between the cover 42 and the clutch driven element 36 and a plurality of coiled springs 50 constantly maintained under compression between the rear wall of the projecting portion 44 of the clutch cover 42 and the pressure plate 48 constantly urge the pressure plate 48 toward the flywheel 16 so as to clamp the driven disc 36 between the pressure plate and the annular rear face of the flywheel 16 for equal rotation therewith. Suitable means including axially directed wing-like lugs 52 on the pressure plate 48 working in cooperating slots 54 formed in the clutch cover 42 serve to effect equal rotation of the pressure plate 48 and flywheel 16 but permit relative axial movement between them in accordance with conventional practice.

A plurality of equally angularly spaced axially parallel posts 56 project through the rear wall of the portion 44 of the clutch cover 42 and are axially slidably received in corresponding openings 58 in the pressure plate 48 at their forward end. The rear ends of the posts 56 are threaded and receive thereon nut members 60 which cooperate with the rear wall of the portion 44 of the clutch cover 42 to limit the axially forward position of the posts 56. Diametrically opposed trunnions 62 are formed on each post 56 within the cover 42 and pivotally mounted upon each pair of trunnions 62 is a clutch finger 64 extending in a generally radial direction with respect to the shaft 28. The outer ends of the fingers 64 seat against abutments 66 formed in pocketed relation on the corresponding projections 52, of the pressure plate 48, so that forward movement of the radially inner ends of the fingers 64, to the left as viewed in Fig. 1, acts to force the pressure plate 48 to the right, as viewed in Fig. 1, rearwardly against the force of the springs 50 to relieve the driven member 36 of its clamped relation between the pressure plate 48 and the flywheel 16, thereby to place the clutch in disengaged position. Adjustment of the nuts 60 to vary the axial position of the posts 56 with respect to the clutch cover 42, may be relied upon to vary the position of the fingers 64 to compensate for wear of the friction material 38, although as will hereinafter be apparent the use of the present invention makes the necessity of such adjustment relatively infrequent and necessary only where the wear of the friction elements 38 is abnormal.

The construction of the clutch described thus far is more or less conventional and any other conventional clutch of the spring packed type may be employed in its stead.

In accordance with the present invention a sleeve 70 loosely surrounds the shaft 28 rearwardly, or to the right of the clutch cover 42 as viewed in Fig. 1, and the forward end of this sleeve is received within the central aperture of the portion 46 of the clutch cover 42 and is suitably fixed therein. Surrounding the sleeve 70 are two cam members 72 and 74 respectively and as best illustrated in Figs. 2 and 7 these cam members are provided on their axially opposed faces with opposed circumferentially extending helically inclined cam surfaces 76, three of such surfaces being illustrated on each of the cam members 72 and 74 in the particular construction shown. A ring 78 rotatable and slidable surrounds the sleeve 70 between the cam members 72 and 74 and is provided with three radially projecting equally angularly spaced pins 80 upon each of which a roller 82 is suitably rotatably mounted. The rollers 82, as will be observed, are disposed between opposed cam faces 76. When the clutch is in engaged position and the servo mechanism in inoperative position as illustrated in Fig. 1, the rollers 82 have been urged to the low points of their respective cam surfaces 76 and against the abutments 84 formed between adjacent cam surfaces 76 on the same cam members 72 or 74, as illustrated in Fig. 2, so as to permit the cam members 72 and 74 to assume a position of minimum combined length. When the servo mechanism is actuated so as to cause a relative rotation between the cam members 72 and 74, then the rollers 82 are caused to roll up their respective cam surfaces 76 and to approach the upper ends thereof as illustrated in Figs. 5 and 7, thus causing the cam members 72 and 74 to assume a position approaching their position of maximum combined length. It may be observed, in passing, that to cause the rollers 82 to move from the position illustrated in Figs. 1 and 2 where the cam members 72 and 74 are of a minimum combined length, to the position illustrated in Figs. 5 and 7 where they are in a position of maximum combined length, it is necessary for the cam members 72 and 74 to rotate relative to each other an angular distance equal to approximately twice the length of the cam surfaces 76, in other words to approximately 240 degrees of rotation, this being a result of the rolling action of the rollers 82 on the cam surfaces 76. This is of advantage as will hereinafter be more apparent due to the fact that the effort required to separate the cam members 72 and 74 the desired degree to effect disengagement of the clutch is extended to substantially twice the distance that would be otherwise required if the rollers 82 were eliminated and the cam surfaces 76 were allowed to contact each other directly.

Again referring to Fig. 1, it will be noted that the cam member 72 has secured to its forward face a disc member 86 the rearwardly directed face of which is provided with a suitable annular facing 88 of friction material secured thereto. The inner portion of the disc 86 is formed to provide a forwardly directed sleeve portion 89 slidably and rotatably received upon the sleeve 70 and serving as a support for a thrust-bearing assembly indicated generally at 90. The forward face of the thrust-bearing 90 is adapted for contact with the inner ends of the clutch fingers 64 so that as the thrust-bearing 90 moves forwardly, or to the left as viewed in Fig. 1, with the cam member 72, as the cam members 72 and 74 are caused to be separated from the position indicated in Fig. 2 towards the position indicated in Fig. 7, the inner ends of the clutch fingers 64 will be forced forwardly to thereby withdraw the pressure plate 48 rearwardly from the flywheel 16 and release the clutch driven disc 36 from its clamped relation between them.

Projecting transversely through the clutch housing 18 below the center of the shaft 28 is a clutch operating shaft 100 having suitable bearings at its opposite ends in opposite sides of the clutch housing 18 and having formed centrally thereon a clutch throw-out yoke 102 including upwardly extending arms 104 disposed on opposite sides of the shaft 28. As indicated best in Figs. 1, 8 and 9 the outer ends of the arms 104 in diametrical alignment with the axis of the shaft 28 are each provided with a forwardly facing semi-cylindrical notch 106 in which diametrically outwardly projecting trunnion sleeves 108 of a ring member 110 surrounding the shaft 28 and cam member 74 are suitably received. The trunnion sleeves 108 are each maintained in their respective notch 106 by means of a C-shaped spring member 112, one end of which extends into the hollow interior of its corresponding trunnion 108 and through an opening 114 in the wall thereof and into contact with the surface of the corresponding notch 106. The opposite ends of the springs 112 are each received in the grooved rearwardly facing surface of the corresponding arm 104 as illustrated in Fig. 9 in which position the spring members 112 are maintained under an expansive force. The spring members 112 thus not only hold the trunnions 108 in place and consequently the ring 110 in proper relative position with respect to the various parts, but the spring members 112 in pressing against the surface of the notch 106 sets up a sufficient frictional resistance to rotation of the trunnions 108 in the notches 106 as to hold the ring 110 and parts carried thereby against inadvertent movement but permitting such movement under the influence of an appreciable pressure as will hereinafter be more apparent.

As best illustrated in Figs. 1, 5 and 8 the ring member 110 is provided with diametrically opposed radially outwardly vertically disposed cylindrical projections 114. A ring member 116 normally disposed over the cam members 72 and 74 and in radially spaced relation with respect thereto is provided with a pair of rearwardly extending yoked portions 118 in which the corresponding projections 114 are rotatably received. A cotter pin 120 extending between the opposed arms of each of the yokes 118 confines the corresponding projection 114 in each of the yokes. The forward face of the ring 116 is formed to provide a flat annular axially directed face 122 adapted for engagement with the rear face of the friction element 88. One end of the clutch operating shaft 100 projects outwardly of the clutch housing 18 and is there provided with a conventional foot operated clutch pedal 124 fixed thereto.

It will be apparent that when the foot pedal 124 is depressed, causing rotation of the clutch actuating shaft in a counter-clockwise direction as viewed in Fig. 1, the upper ends of the yoke arms 104 in moving forwardly act through the trunnions 108, ring 110 and projections 114 to move the ring 116 forwardly and to bring the forward face 122 thereof into frictional engagement with the friction element 88 secured to the disc 86. Considering now for the moment that the rear cam member 74 is maintained stationary and against both axial and rotational movement with respect to the sleeve 70, and the crank shaft 10 and consequently the flywheel 16, sleeve 70 and parts carried thereby to be rotating, if the foot pedal 124 is depressed to bring the member 116 into contact with the friction facing 88 of the disc 86, the ring 116 in contacting the friction facing 88 will tend to retard the rotation of the disc 86 and consequently the forward cam member 72. Such retardation of the normal rotation of the cam member 72 will effect a relative rotation between the cam members 72 and 74 and, considering the cam members 72 and 74 to be in the relative positions indicated in Figs. 1 and 2 respectively when such retardation of the cam member 72 with respect to the cam member 74 is initiated, the rollers 82 will commence to roll up on their respective cam surfaces 76 and to cause the cam members 72 and 74 to start to move away from each other in an axial direction. The cam member 74 being considered as being restrained against both axial and rotational movement with respect to the sleeve 70, the cam member 72 will be caused to move forwardly, carrying with it the disc 86 and the thrust-bearing 90. The thrust-bearing 90 in moving forwardly will carry the inner ends of the clutch fingers 64 forwardly with it and if sufficient separation of the cam members 72 and 74 is thus effected sufficient forward movement of the inner ends of the clutch fingers 64 will be effected to effect disengagement of the clutch in the manner previously described.

It will be noted, however, that should the pedal 124 be operated to move the ring 116 forwardly a distance sufficient to initiate a retarding effect on the disc 86 and then such forward movement of the ring 116 be checked, the disc 86 and cam member 72 will rotate only sufficiently far with respect to the cam member 74 as to relieve a proportion of the frictional engagement between the friction element 88 and ring 116 necessary to again permit cam members 72 and 74 to rotate equally with each other, at which time further relative rotation between the cam members 72 and 74 and consequently further disengaging movement of the clutch will cease. If at such time and under such circumstances the pedal 124 be again further depressed to again further move the ring 116 further forwardly or to the left as viewed in Fig. 1, the frictional pressure between the ring 116 and the friction element 88 will again be increased and further retardation in the relative rotatable positions of the cam members 72 and 74 will again be effected, causing a further axial displacement of the cam members 72 and 74 and a further disengaging movement of the pressure plate 48. It will thus be apparent that in order to completely disengage the clutch through the operation of the servo mechanism described it is necessary to depress the pedal 124 to advance the ring 116 and to continue to depress the pedal to cause the ring 116 to follow up the forwardly advancing movement of the disc 86 and friction facing 88 until the clutch has been moved to fully disengaged position. By this feature of my invention as disclosed in my previous patent above referred to, it is possible to accurately control the disengaging and likewise the engaging movement of the clutch in accurate conformance to the depressed position of the pedal 124, and consequently absolute control of the clutch in all positions of operation is assured.

It will be apparent to those skilled in the art from the above description that were the cam member 74 fixed against axial movement on the sleeve 70, as the facings 38 of the clutch driven disc 36 wore, permitting the pressure plate 48 to move further forwardly to completely clamp the driven disc against rotation with respect to the flywheel, the inner ends of the fingers 64 will move further rearwardly. Consequently it would be necessary from a practical standpoint, in first adjusting the relationship of the servo mechanism with respect to the main clutch structure, to provide for movement of the rollers 82 for a portion only of the length up the cam surfaces 76, and the outer portions of the length of such surfaces, in order to move the clutch to fully disengaged position and so that as the clutch wore and the inner ends of the fingers 64 tended to move rearwardly due to such wear, sufficient allowance would be provided in the movement of the rollers 82 on the cam surfaces 76 to compensate for such wear. Consequently in such a case it is only possible to utilize a portion of the length of the cam surfaces 76 in order to effect a complete release of the clutch. The present invention deals with a construction whereby travel of the rollers 82 over the complete length of their corresponding cam surfaces 76 may be relied upon at all times to move the clutch to fully disengaged position regardless of any wear occuring in the clutch, and the mechanism provided for this purpose will now be described.

As best illustrated in the large scale views shown in Figs. 4 and 6, a ring 130 is interposed between the cam member 74 and the sleeve 70 and is rotatable and axially slidable relative to both of these parts. The rear or right-hand end of the cam member 74 is formed to provide a rearwardly axially diverging frusto-conical surface 132 outwardly of the ring 130, and the rear of the right-hand end of the ring 130 normally projects to within the confines of the surface 132 and therewithin is provided with a radially outwardly extending circumferential flange 134 not only serving to prevent inadvertent disengagement of the operative relationship of the ring 130 with the cam member 74 in one direction but also serving an additional spring abutment purpose as will presently be brought out. Received within the surface 132 rearwardly or to the right of the ring 130 is a coil spring 136 which surrounds the sleeve 70 and with its ends joined together in a conventional manner and under tension so as to cause it to grip the exterior surfaces of the sleeve 70. Such springs are conventionally known as garter springs. The diameter of the coils of the spring 136 is such that it may simultaneously contact both the surface 132 and the outer surface of the sleeve 70. Loosely surrounding the sleeve 70 rearwardly of the garter spring 136 is a member 138 the radially outward end of which is extended forwardly as at 140 and then outwardly as at 142 to form a flange. The internal diameter of the portion 140 is such as to enable it to be slidably received upon the rearwardly projecting portion of the cam member 74.

As illustrated best in Figs. 1 and 5 stop member 148 is mounted on the extreme rear or right-hand end of the sleeve 70 and is maintained against axial displacement towards the rear thereof by means of a split spring ring 150 suitably received in a circumferential groove in the outer surface of the sleeve 70 in accordance with conventional practice. A coil spring 152 surrounding the sleeve 70 is maintained under constant compression between the stop member 148 and the flange 142 of the member 138. It will be noted upon inspection of Figs. 4 and 6 in particular that the forward face of the member 138 is pressed by the spring 152 against the rear face of the garter spring 136 and thereby tends to urge the garter spring 136 forwardly or to the left as viewed in Figs. 1, 4, 5 and 6.

The ring 130, as illustrated best in Figs. 4 and 6, is of such axial dimensions that when the rollers 82 are positioned at the bottom of their respective cam surfaces 76 so that the cam members 72 and 74 are in a position of minimum combined length, the ring 78 in being urged rearwardly or to the right under the influence of the packing springs 50 as transmitted through the pressure plate 48, clutch fingers 64, thrust-bearing 90, disc 86, cam member 72, rollers 82 and pins 80, forces the ring member 130 rearwardly against the garter spring 136 and through it forces the member 138 and the garter spring 136 rearwardly against the force of the spring 152 so as to bring the garter spring 136 out of contact with the frusto-conical surface 132. In this relation of the parts as indicated in Figs. 1 and 4 the inner ends of the clutch fingers 64 have moved rearwardly to a position sufficient to permit complete engagement of the clutch, and have moved all parts of the servo mechanism rearwardly against the relatively weak pressure of the spring 152. If it should now be desired to actuate the clutch to disengage position, upon initial downward movement of the pedal 124 and consequent initial relative rotational movement between the cam members 72 and 74, the rollers 82 and the cam members will be caused to axially separate. Inasmuch as the cam member 74 is free to slide on the sleeve 70 at the initiation of such movement and inasmuch as the spring 152 is relatively weak as compared to the packing springs 50, the initial separating movement of the cam members 72 and 74 will occur as rearward movement of the cam member 74. The rollers 82 and consequently the ring 78 will also move rearwardly upon this initial movement of the servo mechanism but, because of the relation of the movement of the rollers 82 with respect to the cam surfaces 76, at only one half the speed at which the cam member 74 moves and for only one-half the distance. Because of this latter fact as the cam member 74 moves rearwardly upon initial movement of the servo mechanism, the ring 78 relatively withdraws forwardly therefrom and as it withdraws forwardly the spring 152 acting through the member 138 and garter spring 136 forces the ring 130 to follow it until such time as the garter spring is engaged between the frusto-conical surface 132 of the cam member 74 and the surface of the sleeve 70. When this occurs the garter spring 136 locks the cam member 74 against further axially rearward movement on the sleeve 70 as well as against rotation relative to the sleeve 70.

It may be noted that the amount of initial relative rotation between the cam members 72 and 74 required to lock the cam member 74 to the sleeve 70 as above described is relatively slight so that, once the cam member 74 is locked to the sleeve 70, continued relative rotation of the cam members 72 and 74 will utilize substantially the full length of the cam surfaces 76 for the rollers 82 in moving the clutch to disengaged position. It will be apparent, of course, that as soon as the cam member 74 is locked against further movement by the garter spring 136, continued relative rotation between the cam members 72 and 74 in the initial direction of rotation will thereafter cause the cam member 72 to move forwardly to effect disengaging movement of the clutch. In other words, immediately upon the cam member 74 being locked to the sleeve 70, further depression of the pedal 124 will cause clutch disengaging movement of the servo and clutch mechanisms in identically the same manner as first described, the cam member 74 being, to all intents and purposes, firmly fixed to the sleeve 70 against movement in either a rotational or rearward direction during the operation. Likewise, as the pedal 124 is released, the clutch will be engaged in a corresponding manner until it is substantially fully engaged, at which time the rollers 82 will again have substantially reached the lowest points on the respective cam surfaces 76, bringing the ring 78 again into contact with the ring 130 whereupon the ring 130 will be urged rearwardly and will free the garter spring 136 from its clamped relation between the surface 132 and the outer surface of the sleeve 70 and will again permit relatively free axial and rotational movement of the cam member 74 relative to the sleeve 70. Consequently, should any wear have occurred in the clutch during such disengaging and engaging movements just described necessitating a re-adjustment of the position of the inner ends of the clutch fingers 64, the release of the cam member 74 will permit a complete re-adjustment of all of the parts of the servo mechanism to compensate for such re-adjustment of the ends of the fingers 64 and upon the next actuation of the pedal 124 to effect another disengagement of the clutch the cam member 74 will again be locked in this newly adjusted position to permit such disengagement of the clutch in identically the same manner and with the same relative degree of rotation between the cam members 72 and 74 as in the case first described. From the above, it will be understood that by the means described, any wear of the clutch will be automatically compensated for by this mechanism during each inoperative period of the servo mechanism each time the clutch is allowed to assume its fully engaged relation. No manual adjustment of any sort is necessary and, yet, all wear of the clutch is automatically taken care of throughout substantially the entire life of the clutch.

It will also be apparent that should some conditions arise during operation of the clutch which will permit the inner ends of the clutch fingers 64 to come to rest in a forwardly positioned relation to that existing at the time the clutch disengagement was initiated, as soon as the clutch is released, the force of the spring 152 in such case will shift the servo mechanism bodily forwardly until it is stopped by engagement with the inner ends of the fingers 64 to thus automatically adjust the servo mechanism to this particular change of condition. Such a condition might arise, for instance, where the peculiar characteristics of the friction facings 38 or clutch driven element 36 cause the same to increase in thickness under the influence of a rise in temperature, contact with liquid such as lubricating oil, or the like, or some other condition likely to be met with in service. Thus, it will be understood that the mechanism described is such as to automatically compensate any variations whatever that may occur, either in the main clutch itself, or in the servo mechanism during continued operation thereof and to re-adjust the servo mechanism after each operation of the clutch to take care of such condition.

It might also be noted that should the cam members 72 and 74 become angularly displaced from their normal operative positions, from any reason or other, as soon as the clutch is fully released and the cam member 74 unlocked from the sleeve 70, it may rotate under the influence of the pressure of the springs 50 and/or 152 and the angularity of the cam surfaces 76 until the rollers 82 seat at the lower ends of the cam surfaces 76 on both cam members 72 and 74, thus automatically re-aligning them.

An additional feature to which it is desired to call attention is the automatic equalization obtained between the contacting faces of the ring 116 and the friction facing 88 of the servo mechanism during operation thereof. This is due to the fact that the ring 116 is not only pivotable about the axes of the projections 114, which extend vertically, but also about the axes of the trunnions 108, which extend horizontally. This gives a universal mounting for the ring 116 which permits it to adjust itself under all circumstances for equal engagement of its forward face 122 with the rear face of the friction ring 88 throughout their entire extent, thus tending to eliminate any binding which might otherwise occur if the engagement between these parts were not fully equalized.

Formal changes may be made in the specific embodiment of the invention described without departing from the spirit or substance of the broad invention, the scope of which is commensurate with the appended claims.

What I claim is:

1. In combination, a device to be operated, means for operating said device including a relatively rotatable member, stop means for the first mentioned means, means rendering said stop means inoperative when said relatively rotatable member is in a relatively rotatable non-operating position, and means operable upon an initial operative movement of said first mentioned means to lock said stop means against movement axially of said first mentioned means in at least one direction thereby to render said stop means effective.

2. In combination, a device to be operated, a support, means including a pair of relatively rotatable members axially movably arranged on said support for effecting operation of said device, stop means cooperating with said support for limiting movement of the first mentioned means, means rendering said stop means ineffective when one of said members is in a relatively rotatable non-operating position, and means operable to lock said stop means against movement axially of said first mentioned means in at least one direction thereby to render said stop means effective upon an initial relatively rotatable movement of said one of said members toward operating position.

3. In combination, a device to be operated, a support, means including a pair of relatively rotatable members axially movably mounted on said support movable for causing operation of said device, normally ineffective stop means on said support cooperable with the first mentioned means to limit axial movement thereof in one direction, and means cooperating with said stop means so constructed and arranged as to lock said stop means against movement axially of said first mentioned means in at least one direction thereby to render said stop means effective upon an initial relatively rotatable movement between said rotatable members.

4. In a servo mechanism, in combination, a pair of relatively rotatable members so constructed and arranged as to effect relative axial displacement between them upon relative rotation between them, stop means associated with one of said members, and means cooperating between said stop means and the other of said members so constructed and arranged as to render said stop means ineffective when said members are in a position of minimum combined length.

5. In a servo mechanism, in combination, a pair of relatively rotatable members so constructed and arranged as to effect axial advancement of one of said members with respect to the other thereof upon relative rotation between them, stop means for limiting movement of one of said members in one direction of movement, means normally urging said stop means toward operative position, and means co-acting between said stop means and the other of said members so constructed and arranged as to render said stop means ineffective when said members are positioned at one limit of their relatively movable axial positions against the action of the second mentioned means and movable to a position to permit said second mentioned means to render said stop means operative upon an initial axial displacement between said members towards the opposite limit of their movable positions.

6. In a servo mechanism in combination, a support, a pair of relatively rotatable members slidably mounted upon said support and so constructed and arranged as to effect axial displacement of one with respect to the other upon relative rotation between them, stop means cooperable with one of said members to limit movement thereof in one direction, means normally urging said stop means towards effective stopping relation with respect to said one of said members, and means cooperating between the other of said members and said stop means adapted to overcome the second mentioned means when said members are in inoperative position and movable out of interfering relation with respect to said stop means upon initiation of movement between said members towards operating position.

7. In combination, a support, a pair of members rotatably and slidably mounted upon said support, said members being so constructed and arranged that relative rotation between them effects axial displacement of one with respect to the other, means cooperable between one of said members and said support for locking said one of said members against rotation and movement in one direction relative to said support, means normally urging the first mentioned means toward operative relation with respect to said one of said members, and means cooperating between the other of said members and the first mentioned means operable to overcome the second mentioned means and to render the first mentioned means ineffective when said members are at one limit of their relatively movable positions.

8. In combination, a support, a pair of members rotatably and slidably mounted upon said support, said members being so constructed and arranged that relative rotation between them effects axial displacement of one with respect to the other, means cooperable between one of said members and said support for locking said one of said members against rotation and movement in one direction relative to said support, means normally urging the first mentioned means toward operative relation with respect to said one of said members, and means cooperating between the other of said members and the first mentioned means operable to overcome the second mentioned means and to render the first mentioned means ineffective when said members are at one limit of their relatively movable positions and movable out of interfering relation with respect to said stop means upon initiation of movement between said members toward the opposite limit of their movable positions.

9. In a servo mechanism, in combination, a support, a pair of members mounted on said support for relative rotation with respect to each other and so constructed and arranged that relative rotation between them effects axial displacement of one with respect to the other, anti-friction means disposed between said members, guiding means for said anti-friction means, stop means adapted to lock one of said members against movement in one direction on said support, means normally urging said stop means towards operative relation with respect to said one of said members, and means interposed between said stop means and said guide means whereby when said members are at one limit of their relatively movable positions said stop means is moved to inoperative position against the force of the fourth mentioned means, the fifth mentioned means being movable out of interfering relation with respect to said stop means upon initiation of movement between said members towards the opposite limit of their relatively movable positions.

10. In a servo mechanism, in combination, a support, a pair of relatively rotatable members on said support so constructed and arranged that relative rotation between them effects axial movement of one with respect to the other, anti-friction means disposed between said members, guide means for said anti-friction means, one of said members having a frusto-conical surface thereon in generally spaced relation with respect to said support, contractible means interposed between said surface and said support, resilient means normally urging said contractible means into contact with said surface, and means interposed between said guide means and said contractible means operable to move said contractible means out of operative engagement with said surface when said members are at one extremity of their relatively movable positions.

11. In a servo mechanism, in combination, a support, a pair of relatively rotatable members on said support having axially opposed cam surfaces, anti-friction means interposed between the opposed cam surfaces of said members, said cam surfaces being so constructed and arranged and cooperating with said anti-friction means that relative rotation between said members effects axial movement of one of said members with respect to the other thereof, a ring surrounding said support between said members, pins projecting radially from said support for receiving and guiding said anti-friction means thereon, one of said members being formed with a frusto-conical surface arranged in generally spaced relation with respect to said support, a garter spring surrounding said support between said surface and said support, resiliently urged means normally urging said garter spring into clamped relation between said surface and said support, and means interposed between said ring and said garter spring so constructed and arranged that when said members are in a position of minimum combined length said garter spring is forced out of operative relation with respect to said surface, and is movable out of interfering relation with respect to said garter spring upon initiation of relative movement between said members toward their position of maximum combined length.

12. In a clutch structure, in combination, a driving member, a driven member, a pressure plate constantly urged toward a position to clamp said driven member to said driving member, means operable to move said pressure plate to relieve said driven member from clamped relation with respect to said driving member, a servo mechanism operable to move said means, and stop means for limiting movement of said servo mechanism in one direction so constructed and arranged as to be automatically rendered ineffective when said servo mechanism is in inoperative position and to be automatically rendered effective upon initial movement of said servo mechanism in an operating direction.

13. In a clutch structure, in combination, a driving member, a driven member, a spring packed pressure plate constantly urged toward a position to clamp said driven member to said driving member, fingers operable to move said pressure plate away from clamping relation with respect to said driven member, a support, a servo mechanism on said support cooperable with said fingers to move them toward pressure plate released position, stop means associated between said servo mechanism and said support operable to limit movement of said servo mechanism in one direction of movement, means normally urging said stop means toward operative relation, and means operable to render said stop means ineffective when said servo mechanism is in inoperative position.

14. In a clutch structure, in combination, a driving member, a driven member, a pressure plate constantly urged toward a position to clamp said driven member and said driving member together for equal rotation, clutch fingers movable to move said pressure plate to free said driven member from clamped relation with respect to said driving member, a support, a servo mechanism slidably mounted upon said support, said servo-mechanism including a pair of relatively rotatable elements so constructed and arranged as to cause axial movement of one thereof with respect to the other thereof upon relative rotation between them, means cooperable between one of said elements and said support to limit axial movement of said element in one direction, means normally urging the first mentioned means toward operative relation with respect to said one of said elements, and means cooperating between the other of said elements and said first mentioned means so constructed and arranged as to move said first mentioned means to inoperative relation with respect to said one of said elements when said elements are in inoperative position and movable to permit said second mentioned means to move the first mentioned means to operative position upon an initial movement of said elements from inoperative position toward operative position.

15. In a clutch structure, in combination, a driving member, a driven member, a spring pressed pressure plate normally urging said driven member towards clamped relation with respect to said driving member, a support, a pair of relatively rotatable cam members upon said support so constructed and arranged that relative rotation between them effects axial advancement of one with respect to the other, anti-friction means between said cam members, a support for said anti-friction means, one of said cam members being provided with a frusto-conical surface arranged in spaced relation with respect to said support, a garter spring surrounding said support and engageable with said surface, spring means normally urging said garter spring toward contact with said surface, and means interposed between said garter spring and the second mentioned support operable when said members are in a position of minimum combined length to move said garter spring out of operative relation with respect to said surface and movable upon an initial movement between said members away from a position of minimum combined length out of interfering relation with respect to said garter spring.

16. In a servo mechanism, in combination, a pair of relatively rotatable members so constructed and arranged that relative rotation between them effects axial advancement of one with respect to the other, an axially facing brake element operatively connected to one of said members for movement therewith, a shaft extending transversely with respect to the axis of said servo mechanism, yoke arms on said shaft extending on opposite sides of said servo mechanism, a supporting member surrounding said servo mechanism and pivotally connected to said supporting arms for oscillatory movement about a horizontally extending axis, means frictionally resisting oscillatory movement of said supporting member with respect to said arms, a second brake element pivotally supported on said supporting member for oscillatory movement about a vertically extending axis and movable upon oscillation of said shaft into engaging relation with respect to the first mentioned brake element.

ROBERT C. RUSSELL.